US008943544B2

(12) United States Patent
Matsubara et al.

(10) Patent No.: US 8,943,544 B2
(45) Date of Patent: Jan. 27, 2015

(54) SERVICE INFORMATION PROVISION APPARATUS AND SERVICE INFORMATION ACQUISITION APPARATUS

(75) Inventors: Masami Matsubara, Tokyo (JP); Shigeru Imai, Tokyo (JP); Shin Miura, Tokyo (JP); Shinji Akatsu, Tokyo (JP); Kohtaro Asai, Tokyo (JP); Takumi Akiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 21 days.

(21) Appl. No.: 13/128,660

(22) PCT Filed: Nov. 11, 2009

(86) PCT No.: PCT/JP2009/006014
§ 371 (c)(1), (2), (4) Date: May 11, 2011

(87) PCT Pub. No.: WO2010/055648
PCT Pub. Date: May 20, 2010

(65) Prior Publication Data

US 2011/0258673 A1 Oct. 20, 2011

(30) Foreign Application Priority Data

Nov. 12, 2008 (JP) ................................ 2008-290084
Sep. 7, 2009 (JP) ................................ 2009-205895

(51) Int. Cl.
*H04N 7/173* (2011.01)
*H04N 21/435* (2011.01)
(Continued)

(52) U.S. Cl.
CPC .......... *H04N 21/435* (2013.01); *H04N 21/235* (2013.01); *H04N 21/2362* (2013.01); *H04N 21/4345* (2013.01); *H04N 21/6125* (2013.01); *H04N 21/8543* (2013.01)
USPC .......................... 725/109; 725/110; 725/114

(58) Field of Classification Search
USPC ........................................ 725/109, 110, 114
See application file for complete search history.

(56) References Cited

U.S. PATENT DOCUMENTS 8,615,781 B2 * 12/2013 Kim et al. .................... 725/109
2008/0002674 A1 1/2008 Lubbers et al.
2008/0155613 A1 * 6/2008 Benya et al. ................... 725/89
(Continued)

FOREIGN PATENT DOCUMENTS

JP 2002-215512 A 8/2002
JP 2008-017468 A 1/2008
(Continued)

OTHER PUBLICATIONS

"Digital Video Broadcasting (DVB); Transport of MPEG-2 TS Based DVB Services over IP Based Networks"; ETSI TS 102 034 V1.3.1 (Oct. 2007).

*Primary Examiner* — Nnenna Epko
(74) *Attorney, Agent, or Firm* — Birch, Stewart, Kolasch & Birch, LLP

(57) ABSTRACT

A service information provision apparatus is provided with a data service information table configured from a service discovery information table showing association of specific information of a service provider and service discovery information as service content information provided by the service provider, and a service offer information table showing association of the service discovery information of the service discovery information table and data contents corresponding to the service discovery information.

2 Claims, 15 Drawing Sheets

(51) Int. Cl.

| | |
|---|---|
| ***H04N 21/235*** | (2011.01) |
| ***H04N 21/2362*** | (2011.01) |
| ***H04N 21/434*** | (2011.01) |
| ***H04N 21/61*** | (2011.01) |
| ***H04N 21/8543*** | (2011.01) |

(56) References Cited

U.S. PATENT DOCUMENTS

| | | | | |
|---|---|---|---|---|
| 2008/0168124 | A1 | 7/2008 | Lee et al. | |
| 2009/0193097 | A1 * | 7/2009 | Gassewitz et al. | 709/218 |
| 2010/0192190 | A1 * | 7/2010 | Savoor et al. | 725/109 |
| 2011/0016501 | A1 * | 1/2011 | Kim et al. | 725/110 |
| 2013/0013780 | A1 * | 1/2013 | Yamagishi | 709/225 |

FOREIGN PATENT DOCUMENTS

| | | | |
|---|---|---|---|
| JP | 2008-263480 | A | 10/2008 |
| WO | WO 2007/040767 | A1 | 4/2007 |
| WO | WO 2008/013629 | A1 | 1/2008 |
| WO | WO 2008/084965 | A1 | 7/2008 |

* cited by examiner

| Element / Attribute | Value (example) | |
|---|---|---|
| CDN Record | | 400 |
| @RecordVersion | 1 | 410 |
| @CDNName | ABC-Telco.net | 411 |
| Service Provider List | | |
| Service Provider | | |
| @ServiceProviderNetworkID | 00A1 | 420 |
| @ServiceProviderName | ABC Telco | 421 |
| @ServiceProviderPushURI | Kousei.abc.net | 422 |
| @ServiceProviderPullAddress | Multicast 12.125.23.21 Port: 6354 | 423 |
| @ServiceProviderSerial | 234 | 424 |

| Element / Attribute | Value (example) | |
|---|---|---|
| Record | | 500 |
| @RecordVersion | 2 | 510 |
| ServiceProvider | | |
| @ServiceProviderDomainName | ABC-Telco.net | 520 |
| @ServiceProviderAuthority | ABC-AggregatorServices.net | 521 |
| @ServiceProviderVersion | 1 | 522 |
| @ServiceProviderLogoURI | ABC-Telco.net/ServiceLogo.jpg | 523 |
| ServiceProviderName | ABC Telephone Company | 524 |
| ServiceProviderDescription | [e-newspaper] on your IPTV<br>[News headlines] latest headlines ticker | 525 |
| Service Offer Summary | | |
| @PushAddress | 100.200.120.40 Port:16000 | 530 |
| @PullAddress | ABC-enews.com | 531 |
| Payload type | | |
| OfferPayloadType@id | 0xF0 | 532 |
| @segmentID | 2 | 533 |
| @segmentVersion | 1 | 534 |
| Service Offer Summary | | |
| @PushAddress | 110.210.10.40 Port: 2340 | 540 |
| @PullAddress | ABC-rss-feed.com | 541 |
| Payload type | | |
| OfferPayloadType@id | 0xF1 | 542 |
| @segmentID | 3 | 543 |
| @segmentVersion | 1 | 544 |

| OfferPayload Type@ID Value | | SD&S record carried | 800 |
|---|---|---|---|
| 0x00 | | Reserved | 810 |
| 0x01 | | Service Provider Discovery Information | 811 |
| 0x02 | | Broadcast Discovery Information | 812 |
| 0x03 | | Content on Demand Discovery Information | 813 |
| 0x04 | | Services from other SPs | 814 |
| 0x05 | | Package Discovery Information | 815 |
| 0x06 | | Broadcast Content Guide Discovery Information | 816 |
| 0x07 to 0xEF | | Reserved | 820 |
| (User Private) 0xF0 to 0xFF | 0xF0 | E-newspaper | 830 |
| | 0xF1 | RSS | 831 |
| | 0xF2 | : | |
| | 0xF3 | | |
| | : | | |
| | 0xFF | | |

| Element / Attribute | Value (example) | 600 |
|---|---|---|
| E-newspaper | | |
| @DomainName | ABC-Telco.net | 610 |
| @Version (of the Offering Record) | 1 | 611 |
| Application@Id | 23 | 612 |
| Name | ABC E-Newspaper | 613 |
| Description | Electronic Newspaper on your IPTV<br>Receive the latest news | 614 |
| Locator | ABC-enewspaper-aws.com | 615 |

| Element / Attribute | Value (example) | 700 |
|---|---|---|
| RSS feed | | |
| @DomainName | ABC-Telco.net | 710 |
| @Version (of the Offering Record) | 1 | 711 |
| Application@Id | 16 | 712 |
| Name | ABC RSS feed | 713 |
| Description | RSS ticker on your IPTV<br>Receive the latest news, weather, sports results. | 714 |
| Locator | ABC-rss-feed16 .com | 715 |

| Element / Attribute | Value (example) | 1200 |
|---|---|---|
| Record | | |
| @RecordVersion | 2 | 1210 |
| ServiceProvider | | |
| @ServiceProviderDomainName | CompanyA.net | 1220 |
| @ServiceProviderAuthority | CompanyA-Aggregator.net | 1221 |
| @ServiceProviderVersion | 1 | 1222 |
| @ServiceProviderLogoURI | CompanyA.net/ServiceLogo.jpg | 1223 |
| ServiceProviderName | Company A | 1224 |
| ServiceProviderDescription | [Karaoke service] on your IPTV [CompanyB Service Provider] Referenced Service | 1225 |
| Service Offer Summary | | |
| @PushAddress | 100.200.120.40 Port:16000 | 1230 |
| @PullAddress | Karaoke-by-A.com | 1231 |
| Payload type | | |
| OfferPayloadType@id | 0xF3 | 1232 |
| @segmentID | 2 | 1233 |
| @segmentVersion | 1 | 1234 |
| Service Offer Summary | | |
| @PushAddress | 21.230.11.7 Port: 2470 | 1240 |
| @PullAddress | CompanyB-webservices.com | 1241 |
| Payload type | | |
| OfferPayloadType@id | 0x04 | 1242 |
| @segmentID | 7 | 1243 |
| @segmentVersion | 1 | 1244 |

| OfferPayload Type@ID Value | | SD&S record carried | 1400 |
|---|---|---|---|
| 0x00 | | Reserved | 1410 |
| 0x01 | | Service Provider Discovery Information | 1411 |
| 0x02 | | Broadcast Discovery Information | 1412 |
| 0x03 | | Content on Demand Discovery Information | 1413 |
| 0x04 | | Services from other SPs | 1414 |
| 0x05 | | Package Discovery Information | 1415 |
| 0x06 | | Broadcast Content Guide Discovery Information | 1416 |
| 0x07 to 0xEF | | Reserved | 1420 |
| (User Private) 0xF0 to 0xFF | 0xF0 | E-book | 1430 |
| | 0xF1 | SMS Messaging | 1431 |
| | 0xF2 | Email | 1432 |
| | 0xF3 | Karaoke | 1433 |
| | : | : | |
| | 0xFF | | |

| Element / Attribute | Value (example) | |
|---|---|---|
| Record | | 1300 |
| @RecordVersion | 1 | 1310 |
| ServiceProvider | | |
| @ServiceProviderDomainName | CompanyB.net | 1320 |
| @ServiceProviderAuthority | CompanyB-Aggregator.net | 1321 |
| @ServiceProviderVersion | 1 | 1322 |
| @ServiceProviderLogoURI | CompanyB.net/ServiceLogo.jpg | 1323 |
| Service Provider Name | B Internet Company | 1324 |
| ServiceProviderDescription | [SMS] SMS messaging on your IPTV<br>[e-mail] e-mail on your IPTV | 1325 |
| Service Offer Summary | | |
| @PushAddress | 30.40.230.10 Port:1000 | 1330 |
| @PullAddress | SMS-CompanyB.com | 1331 |
| Payload type | | |
| OfferPayloadType@id | 0xF1 | 1332 |
| @segmentID | 1 | 1333 |
| @segmentVersion | 1 | 1334 |
| Service Offer Summary | | |
| @PushAddress | 30.40.231.16 Port: 12340 | 1340 |
| @PullAddress | CompanyB-Email-gateway.com | 1341 |
| Payload type | | |
| OfferPayloadType@id | 0xF2 | 1342 |
| @segmentID | 2 | 1343 |
| @segmentVersion | 1 | 1344 |

| Element / Attribute | Value (example) | |
|---|---|---|
| E-newspaper | | 1500 |
| @DomainName | CompanyB.net | 1510 |
| @Version (of the Offering Record) | 2 | 1511 |
| Application@Id | 45 | 1512 |
| Name | SMS Messaging | 1513 |
| Description | SMS service on your IPTV<br>Receive / acknowledge SMS messages | 1514 |
| Locator | CompanyB-SMS.com | 1515 |

| Element / Attribute | Value (example) | 2000 |
|---|---|---|
| | | |
| Record | | |
| @RecordVersion | 2 | 2010 |
| ServiceProvider | | |
| @ServiceProviderDomainName | CompanyX.net | 2020 |
| @ServiceProviderAuthority | CompanyX-Provider.net | 2021 |
| @ServiceProviderVersion | 1 | 2022 |
| @ServiceProviderLogoURI | CompanyX.net/ServiceLogo.jpg | 2023 |
| ServiceProviderName | Company X | 2024 |
| ServiceProviderDescription | [Widget Services from the Internet] Open Internet | 2025 |
| Service Offer Summary | | |
| @PushAddress | 100.200.120.40 Port:16000 | 2030 |
| @PullAddress | WidgetRepositoryOpenInternet.com | 2031 |
| Payload type | | |
| OfferPayloadType@id | 0xF0 | 2032 |
| @segmentID | 2 | 2033 |
| @segmentVersion | 1 | 2034 |
| @WebPortalURL | Web-WidgetsOpenInternet.com | 2035 |
| Service Offer Summary | | |
| @PushAddress | 80.100.220.140 Port:15000 | 2036 |
| @PullAddress | WidgetsInternet.com | 2037 |
| Payload type | | |
| OfferPayloadType@id | 0xF0 | 2038 |
| @segmentID | 1 | 2039 |
| @segmentVersion | 3 | 2040 |
| @WebPortalURL | Web-WidgetsInternet.com | 2041 |

| OfferPayload Type@ID Value | | SD&S record carried | 2100 |
|---|---|---|---|
| 0x00 | | Reserved | 2110 |
| 0x01 | | Service Provider Discovery Information | 2111 |
| 0x02 | | Broadcast Discovery Information | 2112 |
| 0x03 | | Content on Demand Discovery Information | 2113 |
| 0x04 | | Services from other SPs | 2114 |
| 0x05 | | Package Discovery Information | 2115 |
| 0x06 | | Broadcast Content Guide Discovery Information | 2116 |
| 0x07 to 0xEF | | Reserved | 2120 |
| (User Private) 0xF0 to 0xFF | 0xF0 | Open Internet Widget Services | 2130 |
| | 0xF1 | : | |
| | 0xF2 | | |
| | 0xF3 | | |
| | : | : | |
| | 0xFF | | |

| Element / Attribute | Value example (explanation) | |
|---|---|---|
| Widgets Services | | 2200 |
| @DomainName | WidgetsAnyCompany.net | 2203 |
| @Version (of the Offering Record) | 3 | 2204 |
| CalendarWidget | | |
| Application@Id | 231 | 2210 |
| Name | CalendarWidget | 2211 |
| Description | Schedule / calendar service on your IPTV | 2212 |
| Author | Any company | 2213 |
| License | (Usage conditions) | 2214 |
| Language | en (English) | 2215 |
| minver | (minimum version to run the widget) | 2216 |
| maxver | (maximum version to run the widget) | 2217 |
| Rating | 2 (popularity ranking) | 2218 |
| Downloads | 1222 (number of downloads) | 2219 |
| Added | 2008.6.1 (date of addition) | 2220 |
| Updated | 2009.1.1 (latest update date) | 2221 |
| Picked | 1 | 2222 |
| Tag | (tags describing widget) | 2223 |
| Locator | calendarwidget.AnyCompany.com | 2224 |
| PhotoWidget | | |
| Application@Id | 9375 | 2230 |
| Name | PhotoWidget | 2231 |
| Description | Photo Album Service on your IPTV | 2232 |
| Author | Any company | 2233 |
| License | (Usage conditions) | 2234 |
| Language | jp (Japanese) | 2235 |
| minver | (minimum version to run the widget) | 2236 |
| maxver | (maximum version to run the widget) | 2237 |
| Rating | 54 (popularity ranking) | 2238 |
| Downloads | 7522 (number of downloads) | 2239 |
| Added | 2008.9.1 (date of addition) | 2240 |
| Updated | 2009.2.1 (latest update date) | 2241 |
| Picked | 0 | 2242 |
| Tag | (tags describing widget) | 2243 |
| Locator | PhotoWidget.com | 2244 |

SERVICE INFORMATION PROVISION APPARATUS AND SERVICE INFORMATION ACQUISITION APPARATUS

TECHNICAL FIELD

The present invention relates to a service information provision apparatus and a service information acquisition apparatus of a network data service.

BACKGROUND ART

In recent years, internet protocol (IP) based networks including the internet provide, in addition to video contents, information in various types of data formats and data services, and the types of services and provision methods are increasing.

Conventionally, as an internet protocol TV (IPTV) system which sends video contents to a terminal device from a server via an IP network, for example, there is the one disclosed in Patent Document 1. Patent Document 1 discloses a method of discovering a video service for searching and selecting video contents, and a method of discovering video contents.

The service supported by the IPTV system of Patent Document 1 is a video service, and disclosed is a service discovery method concerning TV broadcasts and video on-demand contents as the video contents.

PRIOR ART DOCUMENTS

Patent Documents

Patent Document 1: U.S. Patent Publication No. 2008/0168124

SUMMARY OF THE INVENTION

According to the IPTV service of the foregoing conventional IPTV system, there is a problem in that only limited types of services can be provided since it relates to the sending and receiving of digital video contents such as TV broadcasts and video on-demand contents and the service discovery for searching and selecting the video contents.

With this kind of conventional IPTV system, since the provided IPTV service is limited to the transmission of video contents, it is not possible to accommodate the numerous data services and information provision services to be enabled by the internet.

The present invention is made in order to resolve the foregoing problems. Thus, an object of this invention is to provide a service information provision apparatus and a service information acquisition apparatus available for data/information provision services corresponding to various types of contents, in addition to video contents services.

The service information provision apparatus according to the invention includes: a data service information table in which specific information of a service provider that provides data is associated with service content information provided by the service provider.

Also, the service information acquisition apparatus according to the invention includes: a unit for requesting service discovery information to a service provider configuration information server; a unit for requesting service offer information to the service server that is specified in specific information of the service server indicated in the service discovery information responded to the request made by the unit for requesting the service discovery information; and a unit for acquiring the service offer information responded to the request by the unit for requesting the service offer information.

According to the service information provision apparatus and the service information acquisition apparatus of the invention, an effect is yielded in that it is possible to provide a service information provision apparatus and a service information acquisition apparatus available for data/information provision services corresponding to various types of contents.

BRIEF DESCRIPTION OF THE DRAWINGS

FIG. 5 is an explanatory diagram showing one example of the service provider discovery information table managed by the CDN configuration information server of Embodiment 1 of the invention.

FIG. 6 is an explanatory diagram showing one example of the service provider service discovery information table managed by the IPTV service provider configuration information server of Embodiment 1 of the invention.

FIG. 7 is an explanatory diagram showing one example of the table defining the identification value of the type of service of Embodiment 1 of the invention.

FIG. 8 is an explanatory diagram showing one example of the E-newspaper service offer information table managed by the extension service server of Embodiment 1 of the invention.

FIG. 9 is an explanatory diagram showing one example of the RSS Feed service offer information table managed by the extension service server of Embodiment 1 of the invention.

FIG. 13 is an explanatory diagram showing one example of the service provider service discovery information table managed by the IPTV service provider configuration information server A of Embodiment 2 of the invention.

FIG. 14 is an explanatory diagram showing one example of the table defining the identification value of the type of service of Embodiment 2 of the invention.

FIG. 15 is an explanatory diagram showing one example of the service provider service discovery information table managed by the external IPTV service provider configuration information server B with a different CDN of Embodiment 2 of the invention.

FIG. 16 is an explanatory diagram showing one example of the service offer information table for managing the SMS service provided by the extension service server of Embodiment 2 of the invention.

FIG. 20 is an explanatory diagram showing one example of the service provider service discovery information table managed by the IPTV service provider configuration information server of Embodiment 3 of the invention.

FIG. 21 is an explanatory diagram showing one example of the table defining the identification value of the type of service of Embodiment 3 of the invention.

FIG. 22 is an explanatory diagram showing one example of the service offer information table for managing the Widgets service provided by the extension service server of Embodiment 3 of the invention.

BEST MODE FOR CARRYING OUT THE INVENTION

Embodiment 1

In Embodiment 1 of the present invention, one example of providing service provider service discovery information for discovering an extension service within the scope of the same service provider to a terminal device is now explained.

Figure 1:
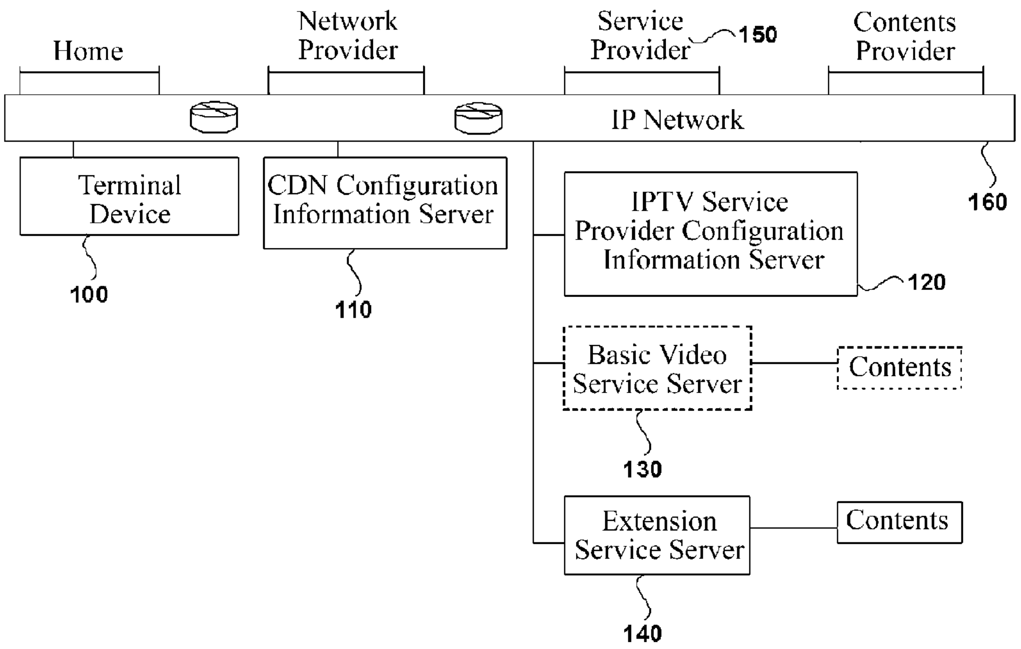
FIG. 1 is an explanatory diagram showing one example of the configuration of Embodiment 1 of the present invention.

FIG. 1 is an explanatory diagram showing one example of the configuration of Embodiment 1 of the invention. In FIG. 1, a terminal device 100 is a terminal using an IPTV service. A content delivery network (CDN) configuration information server 110 manages information concerning service providers including address information of an IPTV service provider configuration information server 120. The IPTV service provider configuration information server 120 manages information for discovering and using basic video services and extension services, and also manages information for discovering an IPTV service provider configuration information server of other service providers. A basic video service server 130 provides IPTV basic video services, and provides the server functions of an IP broadcast server and/or a video on-demand server. An extension service server 140 provides data and information services not limited to video contents. Service discovery information of the basic video service server 130 and the extension service server 140 is managed by the IPTV service provider configuration information server 120. Service provider 150 shows the operational domain of the service provider providing the IPTV service. The service provider 150 includes, in addition to the IPTV service provider configuration information server 120, the basic video service server 130 and/or the extension service server 140. An IP network 160 provides an environment that enables the mutual communication of the terminal device 100 and the respective servers (CDN configuration information server 110, IPTV service provider configuration information server 120, basic video service server 130, extension service server 140).

Next, an operation thereof is described.

Figure 2:
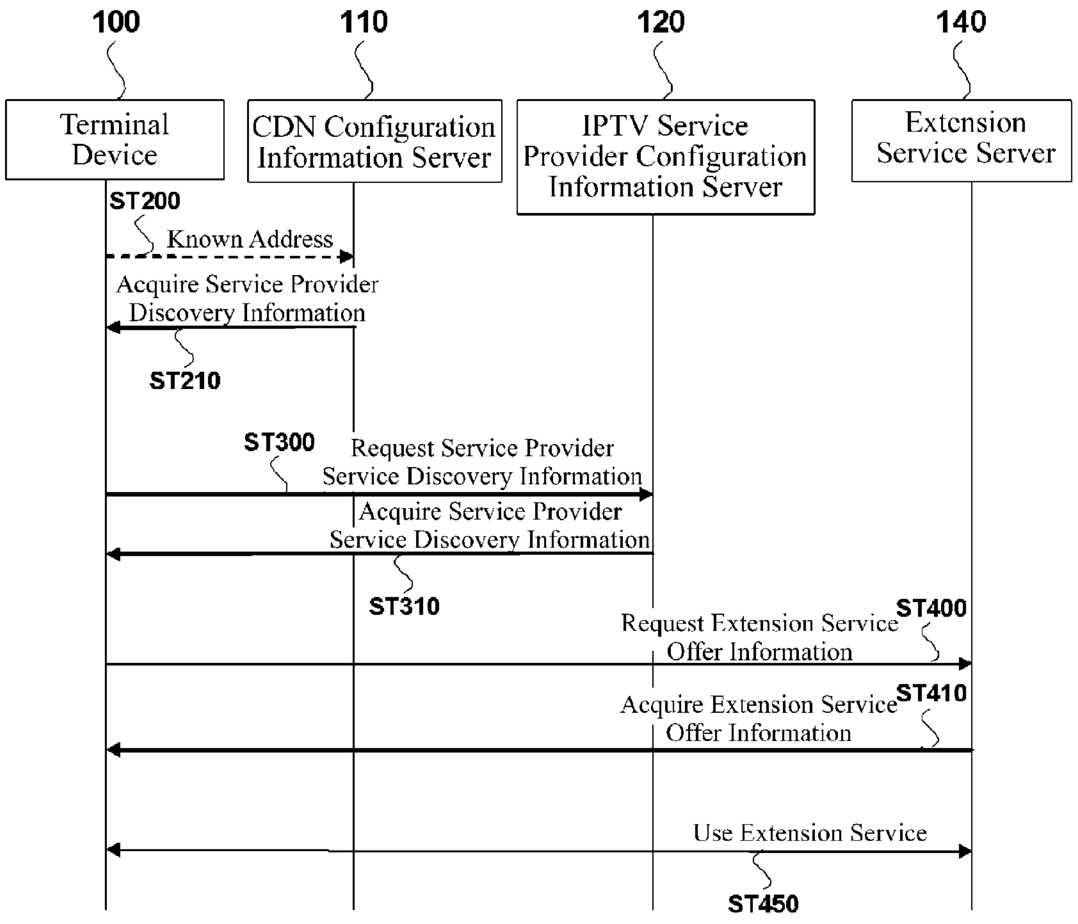
FIG. 2 is an explanatory diagram showing one example of the operation sequence of service discovery in Embodiment 1 of the invention shown in FIG. 1.

FIG. 2 is an explanatory diagram showing one example of the operation sequence of service discovery in Embodiment 1 of the invention shown in FIG. 1. The sequence from the start-up of the terminal device 100 to the service discovery is now explained in accordance with the operation sequence diagram of FIG. 2.

The terminal device 100 uses a known multicast address and a port, or uses a known unicast address and requests service provider discovery information to the CDN configuration information server 110 (ST200). In response to this request, the CDN configuration information server 110 sends the service provider discovery information of one or more IPTV service provider configuration information servers (ST210).

The terminal device 100 parses the acquired service provider discovery information, and acquires the address information of the IPTV service provider configuration information server. The terminal device 100 uses the address information and requests service provider service discovery information to the IPTV service provider configuration information server 120 (ST300). In response to this request, the IPTV service provider configuration information server 120 sends the service provider service discovery information (ST310). The acquired information includes information concerning the services provided by the service provider 150. Since this information contains the brief description and address information of the respective services, a user can request detailed information concerning the services that are of interest to that user.

The terminal device 100 requests extension service offer information to the extension service server 140 (ST400). In response to this request, the extension service server 140 sends the extension service offer information (ST410). The acquired information contains the detailed description and address information of the relevant service. Finally, the terminal device 100 uses the extension service by using the address information obtained at ST410 (ST450).

Figure 3:
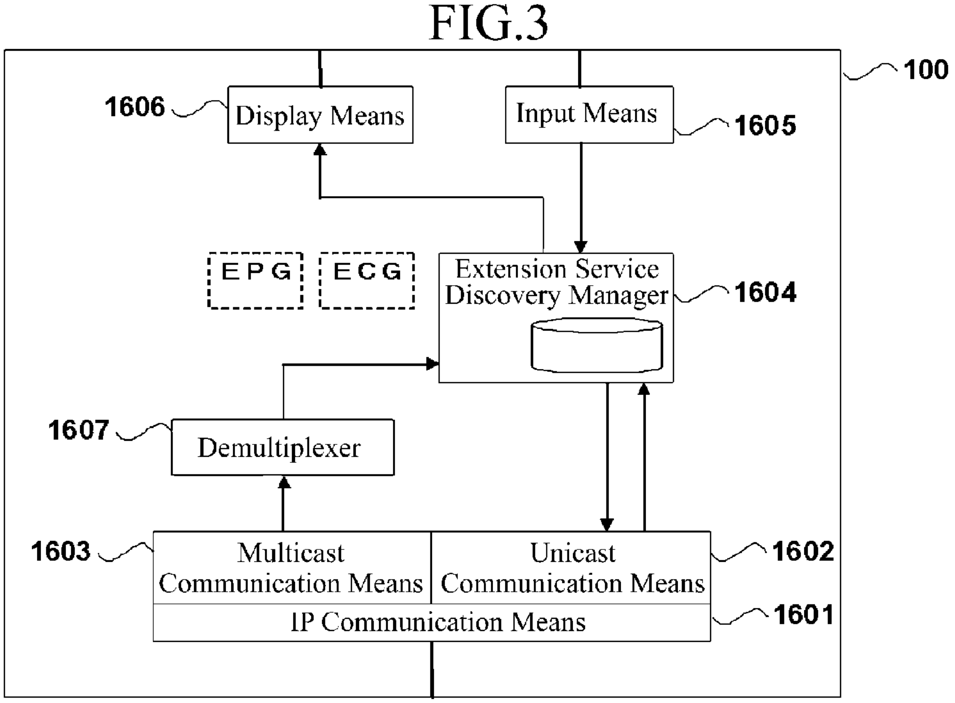
FIG. 3 is an explanatory diagram showing one example of the configuration of the terminal device in Embodiment 1 of the invention.

FIG. 3 is an explanatory diagram showing one example of the configuration of the terminal device 100 in Embodiment 1 of the present invention. In FIG. 3, the IP communication unit 1601 communicates with the configuration information server and the extension service server on the IP network.

A unicast communication unit 1602 processes a TCP protocol group (for example, TCP/IP, HTTP/TCP/IP, TTS/HTTP/TCP/IP, HTTPS/TCP/IP, RTSP/TCP/IP) in a lower-level IP layer and a higher-level application layer. A multicast communication unit 1603 processes a UDP protocol group (for example, UDP/IP, RTP/UDP/IP, RTP-FEC/UDP/IP, TTS/RTP-FEC/UDP/IP) in a lower-level IP layer and a higher-level application layer. A demultiplexer 1607 performs demultiplex processing of MPEG TS (transport stream) sent from the lower-level layer. An extension service discovery manager 1604 sends a request to the respective servers such as the CDN configuration information server 110, the IPTV service provider configuration information server 120 and the extension service server 140 via the unicast communication unit 1602 and the IP communication unit 1601, receives and stores information from these servers, and performs analysis regarding the available servers and services. A display unit 1606 introduces the available servers and services that are analyzed by the extension service discovery manager 1604 to the user. An input unit 1605 is used for inputting feedback from the user into the extension service discovery manager 1604.

The operation of the terminal device 100 is now described in accordance with the operation sequence of FIG. 2 and the configuration diagram of FIG. 3.

The extension service discovery manager 1604 sends a request using a known unicast address of the CDN configuration information server 110 in order to acquire service provider discovery information from the CDN configuration information server 110 (ST200). The service provider discovery information is sent at ST210. The extension service discovery manager 1604, in the case of a multicast, detects service provider discovery information from the multicast stream that is received from the demultiplexer 1607 by using a known multicast address (ST210). The extension service discovery manager 1604 stores the service provider discovery information detected at ST210 in a storage device.

The extension service discovery manager 1604 sends a request using the unicast address acquired at ST210 in order to acquire service provider service discovery information from the IPTV service provider configuration information server 120 (ST300). The service provider service discovery information is sent at ST310, and delivered to the extension service discovery manager 1604 through the IP communication unit 1601 and the unicast communication unit 1602. The extension service discovery manager 1604, in the case of a multicast, detects the service provider service discovery information from the multicast stream that is received from the demultiplexer 1607 by using the multicast address acquired at ST210 (ST310). The extension service discovery manager 1604 stores the service provider service discovery information detected at ST310 in a storage device.

The extension service discovery manager 1604 introduces the available services to the user through the display unit 1606 based on the service provider discovery information and the service provider service discovery information.

The user specifies the extension service server 140 that is of interest to that user to the extension service discovery manager 1604 via the input unit 1605.

In order to acquire extension service offer information from the extension service discovery server 140, the extension service discovery manager 1604 sends a request by using the unicast address acquired at ST310 (ST400). The extension service offer information is sent at ST410, and delivered to the extension service discovery manager 1604 through the IP communication unit 1601 and the unicast communication unit 1602. The extension service discovery manager 1604 stores the extension service offer information obtained at ST410 in a storage device.

Finally, the extension service discovery manager 1604 introduces the services to the user through the display unit 1606 based on the detailed information of the services contained in the extension service offer information.

Next, management of the discovery information and extension service offer information in Embodiment 1 of the present invention is explained. XML notation is used for managing information in consideration of its suitability for parsing, search and portability.

Figure 4:
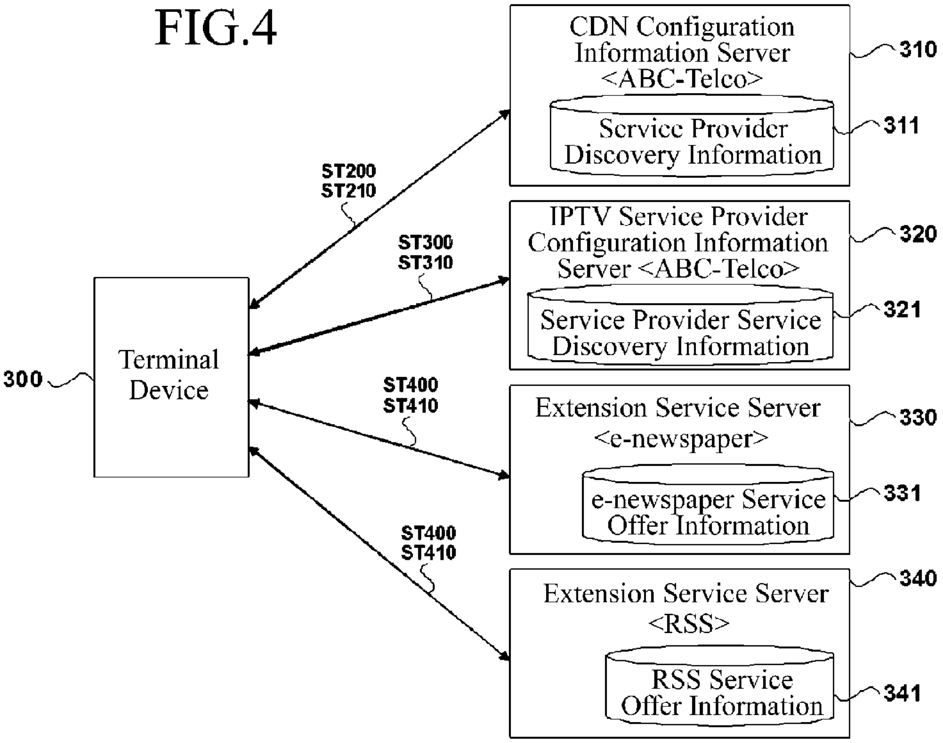
FIG. 4 is an explanatory diagram showing one example of the service provider providing two extension services of Embodiment 1 of the invention.

FIG. 4 is an explanatory diagram showing one example of the service provider providing two extension services of Embodiment 1 of the present invention. In FIG. 4, the terminal device 300 acquires, in order, the information that is managed by the respective servers, and ultimately acquires the respective service offer information. The CDN configuration information server 310 includes: a unit 311 for storing the service provider discovery information, and manages the service provider discovery information. The IPTV service provider configuration information server 320 includes: a unit 321 for storing the service provider service discovery information provided by the service provider, and manages the service provider service discovery information. The extension service servers 330, 340 are servers that actually provide extension services, and, in this example, respectively include: units 331, 341 for storing service offer information concerning an E-newspaper service and an RSS Feed service, manage the service offer information, and provide the E-newspaper service and the RSS Feed service to the terminal device 300.

The service provider discovery information managed by the CDN configuration information server 310, the service provider service discovery information managed by the IPTV service provider configuration information server 320, and the service offer information managed by the extension service servers 330, 340 are managed, for example, with a table using the XML notation explained below. In the following, it is assumed that the service provider discovery information, the service provider service discovery information, and the service offer information mean the respective recorded pieces of information in the service provider discovery information table, the service provider service discovery information table, and the service offer information table.

FIG. 5 is an explanatory diagram showing one example of the service provider discovery information table 400, which indicates the service provider discovery information in XML, managed by the CDN configuration information server 310 of Embodiment 1 of the present invention. In the service provider discovery information table 400 in XML notation shown in FIG. 5, the column of Element/Attribute 401 is the XML element and attribute, those without "@" before their name represent an XML element, and those with "@" before their name represent an attribute. The column of Value 402 shows an example of the value that is adopted by the XML element or attribute.

@RecordVersion 410 manages the version number of the recording of the service provider discovery information, and @CDNName 411 manages the name for identifying the network provider. The version number is useful in determining the validity of the information that is cached in the terminal device 100 by being updated in the case where there is a change in the value of the element.

Items of the Service Provider List are information for discovering the service provider 150, and manage concerning information "ServiceProvider" of at least one service provider according to the following attributes. @ServiceProviderNetworkID 420 is used for identifying the service provider in the video broadcast service. @ServiceProviderName 421 and @ServiceProviderSerial 424 are items for uniquely identifying the service provider. @ServiceProviderPushURI 422 or @ServiceProviderPullAddress 423 is provided to the terminal device 300 so that the terminal device 300 can acquire the service provider service discovery information of the service provider 320.

FIG. 6 is an explanatory diagram showing one example of the service provider service discovery information table 500, which indicates the service provider service discovery information in XML, managed by the IPTV service provider configuration information server 320 of Embodiment 1 of the present invention. In the service provider service discovery information table 500 in XML notation shown in FIG. 6, the column of Element/Attribute 501 shows the XML elements and attributes, those without "@" before their name represent an XML element, and those with "@" before their name represent an attribute. The column of Value 502 shows an example of the value that is adopted by the XML element or attribute.

In the service provider service discovery information table 500 of FIG. 6, @RecordVersion 510 manages the version of the recording of the service provider service discovery information. The version number is useful in determining the validity of the information that is cached in the terminal device by being updated in the case where there is a change in the value of the element.

Items of Service Provider manage the basic information of the service provider according to the following elements and attributes. @ServiceProviderDomainName 520 is an item for uniquely identifying the service provider, @ServiceProviderAuthority 521 shows the service provider to be used in a fee-based service, and @ServiceProviderVersion 522 manages the version of the service provider information. The version number is useful in determining the validity of the information that is cached in the terminal device by being updated in the case where there is a change in the value of the element. @ServiceProviderLogoURI 523 is used for designating the server/resource storing the logo of the service provider. ServiceProviderName 524 and ServiceProviderDescription 525 indicate the service name to the user and a brief description of the service contents.

Items of the Service Offer Summary describe the access information to the extension services according to the following elements and attributes. @PushAddress 530 and @PullAddress 531 describe the multicast address and unicast address for accessing the extension service offer information. The same information is obtained regardless of which address information is used. OfferPayloadType@id 532 is used for identifying the type of service. @segmentID 533 is used for requesting service offer information from a specific OfferPayloadType@id. @segmentVersion 534 is used for confirming whether service offer information of a specific OfferPayloadType@id is stored in the memory. Although the elements and attributes of @PushAddress 540 to @segmentVersion 544 differ from the foregoing @PushAddress 530 to @segmentVersion 534 with respect to the provided services, equivalent information elements and attributes are managed.

FIG. 7 is an explanatory diagram showing one example of the table 800 defining the identification value of the type of service in OfferPayloadType@id of the service provider service discovery information table 500 of Embodiment 1 of the present invention. In the table 800 defining the identification value of the type of service shown in FIG. 7, the column of OfferPayloadType@id Value 801 shows an example of the identification value of the type of service. The column of SD&S record carried 802 shows the meaning of the identification value. In the examples of OfferPayloadType@id 532, 542, the two extension services provided by the service provider are E-newspaper and RSS Feed, and their respective values are 0xF0, 0xF1 based on 830, 831 of FIG. 7.

Since a user private area is used, the extension services provided by the respective service providers can be freely added. Moreover, even if two service providers use OfferPayloadType@id of the same user private area in different extension services, since the pair of "OfferPayloadType@id" and "service provider domain name (ServiceProviderDomainName)" is unique, identification is possible. @segmentID (segment ID) and @segmentVersion (segment version) are described in the cases of dividing an XML document into segments and sending them to a terminal. The terminal uses the segment ID and segment version and requests information of a specific OfferPayloadType@id.

FIG. 8 is an explanatory diagram showing one example of the E-newspaper service offer information table 600, which indicates the E-newspaper service offer information in XML, managed by the extension service server 330 of Embodiment 1 of the present invention. In the E-newspaper service offer information table 600 in XML notation shown in FIG. 8, the column of Element/Attribute 601 shows the XML elements and attributes, those without "@" before their name represent an XML element, and those with "@" before their name represent an attribute. The column of Value 602 shows an example of the value that is adopted by the XML element or attribute.

In the E-newspaper service offer information table 600 of FIG. 8, @DomainName 610 is an item for uniquely identifying the provider providing the extension service. @Version 611 shows the version number of the recorded information. The version number is useful in determining the validity of the information that is cached in the terminal device by being updated in the case where there is a change in the value of the element. Application@Id 612 is an application identifier, and is used for confirming the mutual compatibility between the terminal device 300 and the extension service 330 or 340. The terminal device determines whether a service can be run based on the identifier. Name 613 and Description 614 indicate the service name to the user and detailed descriptions of the service contents. Finally, Locator 615 describes the address information of multicast or unicast for using the service.

FIG. 9 is an explanatory diagram showing one example of the RSS Feed service offer information table 700, which indicates the RSS service offer information in XML, for managing the RSS Feed service (RSS service) provided by the extension service server 340 of Embodiment 1 of the present invention. In the RSS service offer information table 700 in XML notation shown in FIG. 9, the column of Element/Attribute 701 shows the XML elements and attributes, those without "@" before their name represent an XML element, and those with "@" before their name represent an attribute. The column of Value 702 shows an example of the value that is adopted by the XML element or attribute. Although the RSS service offer information table 700 of FIG. 9 differs from the E-newspaper service offer information table 600 of FIG. 8 in that the provided services are different, equivalent information elements and attributes are managed.

Based on the above, a service information provision apparatus comprising as the data service information table: the service provider service discovery information table 500 of the IPTV service provider configuration information server 120; the E-newspaper service offer information table 600; and the RSS Feed service offer information table 700 as an extension service of the extension service server 140 can thereby be configured.

Note that this service information provision apparatus may also be configured to have a data service information table including the service provider discovery information table 400 of the CDN configuration information server 110.

Also, the server configuring the service information provision apparatus may be implemented as a system of distributing the functions to a plurality of server machines via a network rather than supporting all functions with a single server machine.

Further, configured is a terminal device as the service information acquisition apparatus comprising: a unit for requesting service discovery information to the service provider configuration information server 120 that is specified in the specific information of the service provider; a unit for requesting the service offer information to a service server specified in specific information of the extension service server 140 indicated in the service discovery information to be returned in response to the request by the unit for requesting the service discovery information; and a unit for acquiring the service offer information to be returned in response to the request by the unit for requesting the service offer information.

Note that the terminal device as the service information acquisition apparatus may include: a unit for requesting service provider discovery information to the CDN configuration information server 110, and be configured to request service discovery information to the service provider configuration information server 120 specified in the specific information of the service provider indicated in the service provider discovery information that is returned in response to the request by the unit for requesting the service provider discovery information.

The operation sequence shown in FIG. 2 is performed between the service information acquisition apparatus and the service information provision apparatus by using the service provider discovery information table 400, the service provider service discovery information table 500, the E-newspaper service offer information table 600, and the RSS Feed service offer information table 700 managed by the respective servers of the service information provision apparatus.

As described above, according to Embodiment 1 of the present invention, the IPTV service provider configuration information server can provide, to the terminal device, service provider service discovery information for discovering an extension service other than the transmission of video contents as the basic IPTV service, and the terminal device can access the extension service server based on the address information of the extension service server described in the service provider service discovery information. Consequently, the terminal device, which could only consume video contents transmission services in the past, is able to access and provide to the user new data services such as news distribution.

Embodiment 2

In the aforementioned Embodiment 1 of the present invention, explained is one example of providing, to a terminal device, service provider service discovery information for discovering an extension service within the scope of the same service provider. An example of enabling the service discovery of an extension service belonging to a separate service provider is explained in Embodiment 2 of the present invention.

Figure 10:
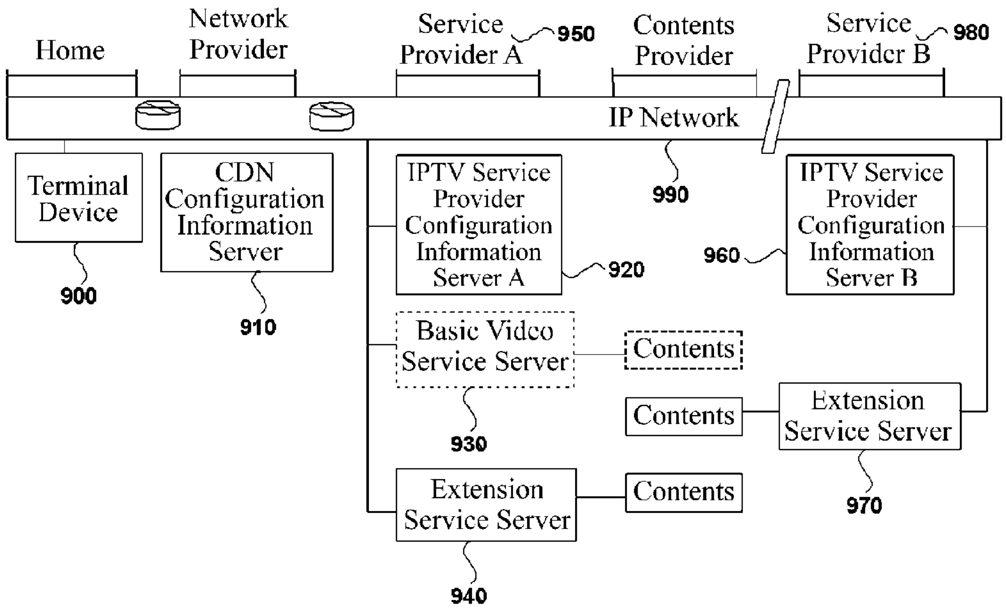
FIG. 10 is an explanatory diagram showing one example of the configuration of Embodiment 2 of the invention.

FIG. 10 is an explanatory diagram showing one example of the configuration of Embodiment 2 of the present invention. In FIG. 10, a terminal device 900 is a terminal using an IPTV service. A content delivery network (CDN) configuration information server 910 manages information concerning service providers including address information of an IPTV service provider configuration information server A 920. The IPTV service provider configuration information server A 920 manages information for discovering and using basic video services and extension services, and manages information for discovering an IPTV service provider configuration information server of other service providers. A basic video service server 930 provides IPTV basic video services, and provides the server function of an IP broadcast server and/or a video on-demand server. An extension service server 940 provides data and information services not limited to video contents. Service discovery information of the basic video service server 930 and the extension service server 940 is managed by the IPTV service provider configuration information server A 920. Service provider A 950 shows the operational domain of the service provider providing the IPTV service. The service provider A 950 includes, in addition to the IPTV service provider configuration information server A 920, the basic video service server 930 and/or the extension service server 940. An IPTV service provider configuration information server B 960 is a server corresponding to the IPTV service provider configuration information server A 920. An extension service server 970 is a server corresponding to the extension service server 940. The IPTV service provider configuration information server B 960 and the extension service server 970 belong to a service provider B 980 of a CDN that is different from the service provider A 950. Service provider B 980 shows the operational domain of the service provider providing the IPTV service. The service provider B 980 includes, in addition to the IPTV service provider configuration information server B 960, the extension service server 970. An IP network 990 provides an environment that enables the mutual communication of the terminal device 900 and the respective servers (CDN configuration information server 910, IPTV service provider configuration information servers A 920, B 960, basic video service server 930, extension service servers 940, 970).

Next, an operation thereof is described.

Figure 11:
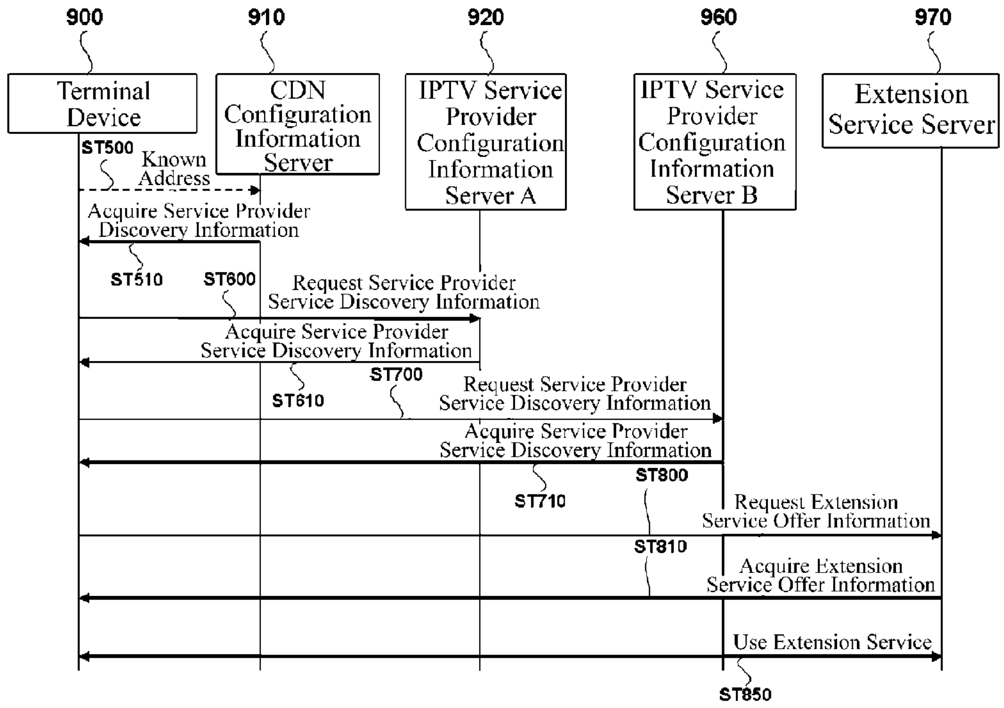
FIG. 11 is an explanatory diagram showing one example of the operation sequence of service discovery in Embodiment 2 of the invention shown in FIG. 10.

FIG. 11 is an explanatory diagram showing one example of the operation sequence of service discovery in Embodiment 2 of the present invention shown in FIG. 10. The sequence from the start-up of the terminal device 900 to the service discovery of a service provider belonging to a different CDN is now explained in accordance with the operation sequence diagram of FIG. 11.

The terminal device 900 uses a known multicast address and a port, or uses a known unicast address and requests service provider discovery information to the CDN configuration information server 910 (ST500). In response to this request, the CDN configuration information server 910 sends the service provider discovery information of one or more IPTV service provider configuration information servers (ST510).

The terminal device 900 parses the acquired service provider discovery information, and acquires the address information of the IPTV service provider configuration information server A 920. The terminal device 900 uses the address information and requests service provider service discovery information to the IPTV service provider configuration information server A 920 (ST600). In response to this request, the IPTV service provider configuration information server A 920 sends the service provider service discovery information (ST610). The acquired information includes information concerning the services provided by the service provider B 980. Since this information contains the brief description and address information of the respective services, and the address information to the IPTV service provider configuration information server B 960 belonging to the external service provider B 980, a user can request detailed information concerning the services that are of interest to that user or concerning the external service provider B 980. Note that it is necessary to access the external IPTV service provider configuration information server B 960 prior to acquiring the service discovery information of the extension service server 970 belonging to the external service provider B 980.

The terminal device 900 requests service provider service discovery information by using the address of the IPTV service provider configuration information server B 960 acquired at ST610 (ST700). In response to this request, the external IPTV service provider configuration information server B 960 sends the service provider service discovery information (ST710).

The terminal device 900 requests extension service offer information to the extension service server 970 (ST800). In response to this request, the extension service server 970 sends the extension service offer information (ST810). The acquired information contains the detailed description and address information of the relevant service. Finally, the terminal device 900 uses the external extension service by using the address information obtained at ST810 (ST850).

Next, management of the discovery information and extension service offer information in Embodiment 2 of the present invention is explained. XML notation is used for managing information in consideration of its suitability for parsing, search and portability.

Figure 12:
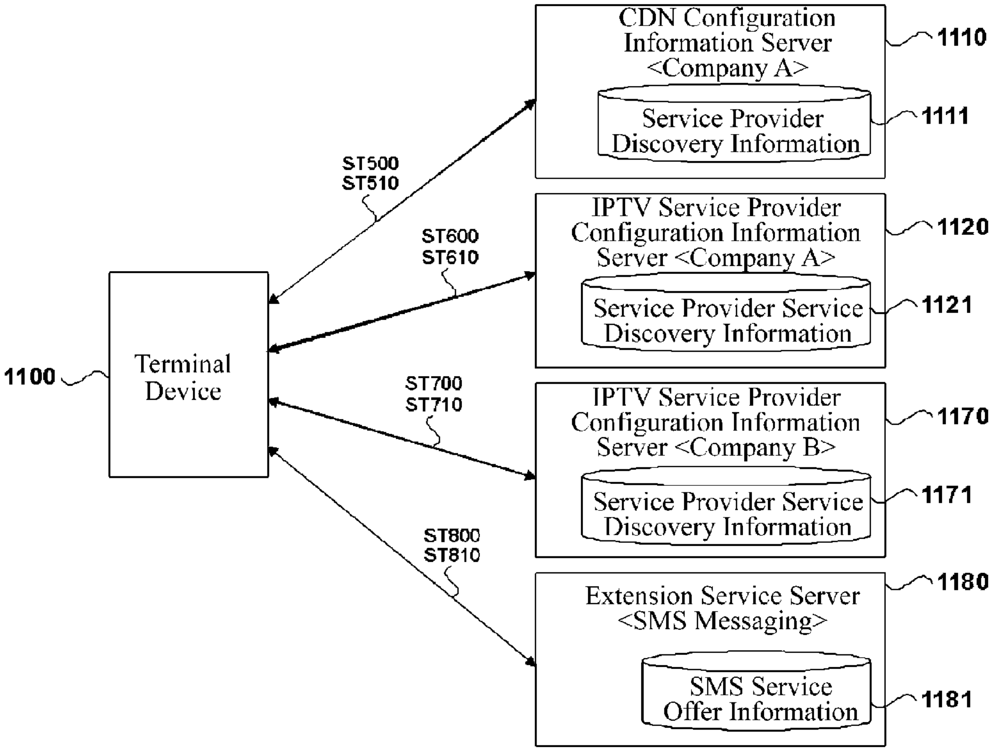
FIG. 12 is an explanatory diagram showing one example of the external service provider B which provides the terminal device of Embodiment 2 of the invention with the extension service via the service provider A.

FIG. 12 is an explanatory diagram showing one example of the external service provider B which provides the terminal device 1100 of Embodiment 2 of the present invention with the extension service via the service provider A. In FIG. 12, the terminal device 1100 acquires the information to be managed by the respective servers in order, and ultimately acquires the external service offer information. The CDN configuration information server 1110 includes: a unit 1111 for storing the service provider discovery information, and manages the service provider discovery information. The IPTV service provider configuration information server A 1120 includes: a unit 1121 for storing the service provider service discovery information provided by the service provider A, and manages the service provider service discovery information. The IPTV service provider configuration information server B 1170 includes: a unit 1171 for storing the service provider service discovery information provided by the service provider B with a different CDN as the service provider A, and manages the service provider service discovery information. The extension service server 1180 includes: a unit 1181 for storing the service offer information of the extension service provided by the external service provider and manages the service offer information of the extension service, and, in this example, provides an SMS Messaging service (SMS service) to the terminal device 1100.

The service provider discovery information managed by the CDN configuration information server 1110, the service provider service discovery information managed by the IPTV service provider configuration information server A 1120, the service provider service discovery information managed by the IPTV service provider configuration information server B 1170, and the service offer information managed by the extension service server 1180 are managed, for example, as a table using the XML notation explained below.

The elements of the service provider discovery information managed by the CDN configuration information server 1110 are the same as the service provider discovery information table 400, which indicates the service provider discovery information in XML, managed by the CDN configuration information server 310 explained with reference to FIG. 5 of Embodiment 1 of the present invention.

FIG. 13 is an explanatory diagram showing one example of the service provider service discovery information table 1200, which indicates the service provider service discovery information in XML, managed by the IPTV service provider configuration information server A 1120 of Embodiment 2 of the present invention. In the service provider service discovery information table 1200 in XML notation shown in FIG. 13, the column of Element/Attribute 1201 shows the XML elements and attributes, those without "@" before their name represent an XML element, and those with "@" before their name represent an attribute. The column of Value 1202 shows an example of the value that is adopted by the XML element or attribute.

@RecordVersion 1210 manages the version of the recording of the service provider service discovery information. The version number is useful in determining the validity of the information that is cached in the terminal device by being updated in the case where there is a change in the value of the element.

Items of the Service Provider manage the basic information of the service provider according to the following elements and attributes. @ServiceProviderDomainName 1220 is an item for uniquely identifying the service provider, @ServiceProviderAuthority 1221 shows the service provider to be used in a pay service, and @ServiceProviderVersion 1222 manages the version of the service provider information. The version number is useful in determining the validity of the information that is cached in the terminal device by being updated in the case where there is a change in the value of the element. @ServiceProviderLogoURI 1223 is used for designating the server resource storing the logo of the service provider. ServiceProviderName 1224 and ServiceProviderDescription 1225 indicate the service name to the user and a brief description of the service contents.

Items of the Service Offer Summary describe the access information to the extension services according to the following attributes. @PushAddress 1230 and @PullAddress 1231 describe the multicast address and unicast address for accessing the extension service offer information. The same information is obtained regardless of which address information is used. OfferPayloadType@id 1232 is used for identifying the type of service. @segmentID 1233 is used for requesting service offer information of a specific OfferPayloadType@id. @segmentVersion 1234 is used for confirming whether service offer information of a specific OfferPayloadType@id is stored in the memory.

FIG. 14 is an explanatory diagram showing one example of the table 1400 defining the identification value of the type of service in OfferPayloadType@id of the service provider service discovery information table 1200 of Embodiment 2 of the present invention. In the table 1400 defining the identification value of the type of service shown in FIG. 14, the column of OfferPayloadType@id Value 1401 shows an example of the identification value of the type of service. The column of SD&S record carried 1402 shows the meaning of the identification value. In the example of OfferPayloadType@id 1232, the extension service provided by the service provider is Karaoke, and the value is 0xF3 based on 1433 of FIG. 14.

Since a user private area is used, the extension services provided by the respective service providers can be freely added. Moreover, even if two service providers use OfferPayloadType@id of the same user private area in different extension services, since the pair of "OfferPayloadType@id" and "service provider domain name (ServiceProviderDomainName)" is unique, identification is possible. @segmentID (segment ID) and @segmentVersion (segment version) are described in cases of dividing an XML document into segments and sending them to a terminal. The terminal uses the segment ID and segment version, and requests information of a specific OfferPayloadType@id.

Moreover, items of the Service Offer Summary describe the access information to the IPTV service provider configuration information server belonging to the external service network according to the following elements and attributes. @PushAddress 1240 and @PullAddress 1241 of Service Offer Summary describe the multicast address and unicast address for accessing the service provider service discovery information of the external IPTV service provider configuration information server 1170. The same information is obtained regardless of which address information is used. OfferPayloadType@id 1242 is used for identifying the type of service. The identification value of the type of service similarly uses the value of the foregoing table 1400 defining the identification value of the type of service of FIG. 14. The example of OfferPayloadType@id 1242 shows an access to the external service provider (Service from Other Service Providers), and the value is 0x04 based on 1414 of FIG. 14. @segmentID 1243 is used for requesting server offer information of a specific OfferPayloadType@id. @segmentVersion 1244 is used for confirming whether service offer information of a specific OfferPayloadType@id is stored in the memory.

FIG. 15 is an explanatory diagram showing one example of the service provider service discovery information table 1300, which indicates the service provider service discovery information in XML, managed by the external IPTV service provider configuration information server B 1170 with a different CDN of Embodiment 2 of the present invention. In the service provider service discovery information table 1300 in XML notation shown in FIG. 15, the column of Element/Attribute 1301 shows the XML elements and attributes, those without "@" before their name represent an XML element, and those with "@" before their name represent an attribute. The column of Value 1302 shows an example of the value that is adopted by the XML element or attribute.

In the service provider service discovery information table 1300 of FIG. 15, @RecordVersion 1310 manages the version of the recording of the service provider service discovery information. The version number is useful in determining the validity of the information that is cached in the terminal device by being updated in the case where there is a change in the value of the element.

Items of the Service Provider manage the basic information of the service provider according to the following elements and attributes. @ServiceProviderDomainName 1320 is an item for uniquely identifying the service provider, @ServiceProviderAuthority 1321 shows the service provider to be used in a fee-based service, and @ServiceProviderVersion 1322 manages the version of the service provider information. The version number is useful in determining the validity of the information that is cached in the terminal device by being updated in the case where there is a change in the value of the element. @ServiceProviderLogoURI 1323 is used for designating the server resource storing the logo of the service provider. ServiceProviderName 1324 and ServiceProviderDescription 1325 indicate the service name to the user and a brief description of the service contents.

Items of the Service Offer Summary describe the access information to the extension services provided by the external service provider according to the following attributes. @PushAddress 1330, 1340 and @PullAddress 1331, 1341 describe the multicast address and unicast address for accessing the extension service offer information. The same information is obtained regardless of which address information is used. OfferPayloadType@id 1332, 1342 are used for identifying the type of service. @segmentID 1333, 1343 are used for requesting service offer information of a specific OfferPayloadType@id. @segmentVersion 1334, 1344 are used for confirming whether service offer information of a specific OfferPayloadType@id is stored in the memory. As in the service provider service discovery information table 1200, the identification value of the type of service similarly uses the value of the foregoing table 1400 defining the identification value of the type of service of FIG. 14. In the examples of OfferPayloadType@id 1332, 1342, the two extension services provided by the service provider are SMS Messaging and Email, and their respective values are 0xF1, 0xF2 based on 1431, 1432 of FIG. 14.

Since a user private area is used, the extension services provided by the respective service providers can be freely added. Also, even if two service providers use OfferPayloadType@id of the same user private area in different extension services, since the pair of "OfferPayloadType@id" and "service provider domain name (ServiceProviderDomainName)" is unique, identification is possible. @segmentID (segment ID) and @segmentVersion (segment version) are described in cases of dividing an XML document into segments and sending them to a terminal. The terminal uses the segment ID and segment version and requests information of a specific OfferPayloadType@id.

FIG. 16 is an explanatory diagram showing one example of the SMS service offer information table 1500, which indicates the service offer information in XML, for managing the SMS Messaging (SMS service) provided by the extension service server 1180 of Embodiment 2 of the present invention. In the SMS service offer information table 1500 in XML notation shown in FIG. 16, the column of Element/Attribute 1501 (SMS Messaging) shows the XML elements and attributes, those without "@" before their name represent an XML element, and those with "@" before their name represent an attribute. The column of Value 1502 shows an example of the value that is adopted by the XML element or attribute.

In the SMS service offer information table 1500 of FIG. 16, @DomainName 1510 is an item for uniquely identifying the provider providing the extension service. @Version 1511 shows the version number of the recorded information. The version number is useful in determining the validity of the information that is cached in the terminal device by being updated in the case where there is a change in the value of the element. Application@Id 1512 is an application identifier, and is used for confirming the mutual compatibility between the terminal device 1100 and the extension service server 1180. The terminal device determines whether a service can be run based on the identifier. Name 1513 and Description 1514 indicate the service name to the user and a brief description of the service contents. Finally, Locator 1515 in 1530 describes the address information of multicast or unicast for using the service.

Based on the above, a service information provision apparatus comprising as the data service information table: the service provider service discovery information tables 1200, 1300 of the IPTV service provider configuration information servers A 920, B 960; and the SMS service offer information table 1500 as the extension service of the extension service server 140 can thereby be configured.

Note that this service information provision apparatus may also be configured to have a data service information table including the service provider discovery information table 400 of the CDN configuration information server 110.

Also, the server configuring the service information provision apparatus may be realized as a system of distributing the functions to a plurality of server machines via a network instead of supporting all functions with a single server machine.

Further, configured is a terminal device as the service information acquisition apparatus comprising: a unit for requesting first service discovery information to the service provider configuration information server A 920 specified in the specific information of the service provider; a unit for requesting second service discovery information to the service provider configuration information server B 960 specified in the specific information of the service provider indicated in the service discovery information that is returned in response to the request by the unit for requesting the first service discovery information; a unit for requesting service offer information to the service server specified in the specific information of the extension service server 970 indicated in the service discovery information that is returned in response to the request by the unit for requesting the second service discovery information; and a unit for acquiring the service offer information that is returned in response to the request by the unit for requesting the service offer information.

Note that the terminal device as the service information acquisition apparatus may include: a unit for requesting service provider discovery information to the CDN configuration information server 110, and be configured to request service discovery information to the service provider configuration information server 120 specified in the specific information of the service provider indicated in the service provider discovery information that is returned in response to the request by the unit for requesting the service provider discovery information.

The operation sequence shown in FIG. 11 is performed between the service information acquisition apparatus and the service information provision apparatus by using the service provider discovery information table 400, the service provider service discovery information tables 1200, 1300, and the SMS service offer information table 1500 managed by the respective servers of the service information provision apparatus.

As described above, according to Embodiment 2 of the present invention, the IPTV service provider configuration information server provides service provider discovery information of the external IPTV service provider, and the external IPTV service provider configuration information server provides, to the terminal device, service provider service discovery information for discovering the extension service. Consequently, the terminal device can access the extension service server of the external IPTV service provider.

Embodiment 3

In the aforementioned Embodiment 1 of the present invention, explained is one example of providing, to a terminal device, service provider service discovery information for discovering an extension service within the scope of the same service provider. Moreover, in Embodiment 2 of the present invention, explained is one example of enabling the service discovery of an extension service belonging to a separate service provider. One example of enabling the service discovery of an extension service on the standard internet without being limited to a CDN by using a service provider configuration information server is explained in Embodiment 3 of the present invention. In this case, there is no need to use the service provider configuration information server of the service provider to which the extension service belongs. Moreover, although the extension service server of this example explains a Widgets service that provides a plurality of services, it may also be a single service.

Figure 17:
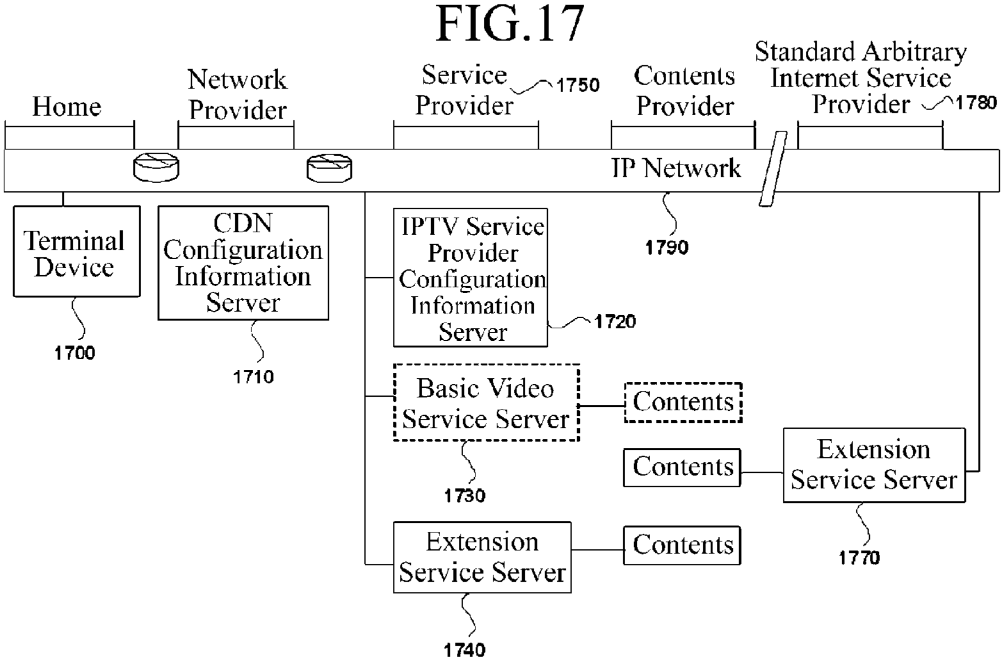
FIG. 17 is an explanatory diagram showing one example of the configuration of Embodiment 3 of the invention.

FIG. 17 is an explanatory diagram showing one example of the configuration of Embodiment 3 of the present invention. In FIG. 17, a terminal device 1700 is a terminal using an IPTV service. A content delivery network (CDN) configuration information server 1710 manages information concerning service providers including address information of an IPTV service provider configuration information server 1720. The IPTV service provider configuration information server 1720 manages information for discovering and using basic video services and extension services, and manages information for discovering an extension service server of an arbitrary service provider. A basic video service server 1730 provides IPTV basic video services, and provides the server functions of an IP broadcast server and/or a video on-demand server. An extension service server 1740 provides data and information services not limited to video contents. Service discovery information of the basic video service server 1730 and the extension service server 1740 is managed by the IPTV service provider configuration information server 1720. Service provider 1750 shows the operational domain of the service provider providing the IPTV service. The service provider 1750 includes, in addition to the IPTV service provider configuration information server 1720, the basic video service server 1730 and/or the extension service server 1740. An extension service server 1770 is a server corresponding to the extension service server 1740. Moreover, the extension service server 1770 belongs to an arbitrary service provider 1780 of a CDN or standard internet that is different from the service provider 1750. The standard internet is one example of the arbitrary service provider. The arbitrary service provider 1780 includes the extension service server 1770. An IP network 1790 provides an environment that enables the mutual communication of the terminal device 1700 and the respective servers (CDN configuration information server 1710, IPTV service provider configuration information server 1720, basic video service server 1730, extension service servers 1740, 1770).

Next, an operation thereof is described.

Figure 18:
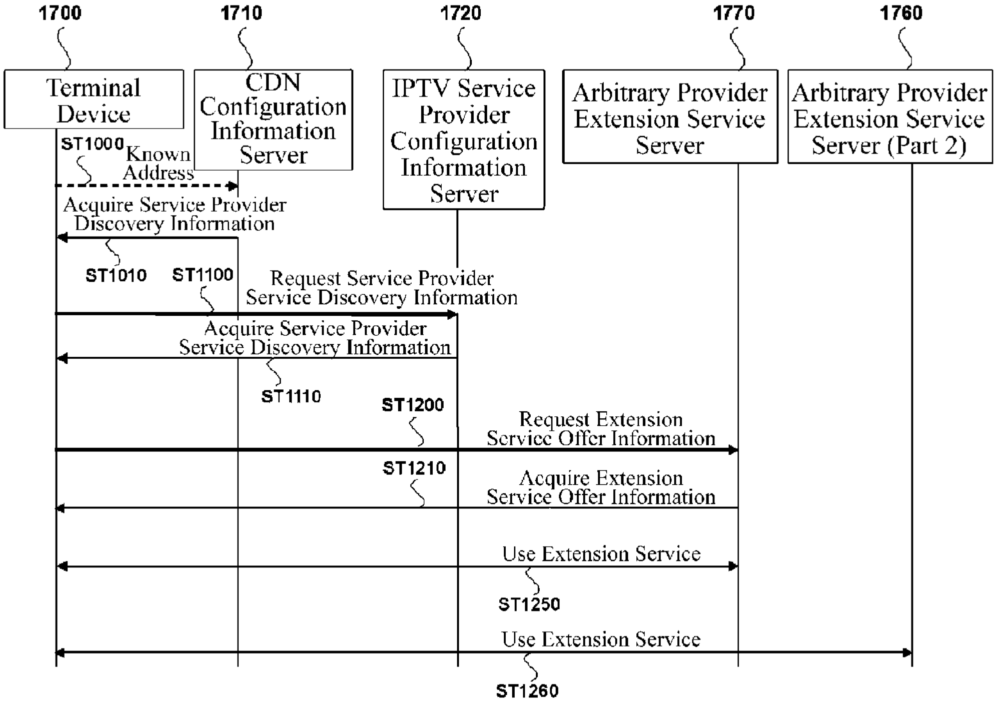
FIG. 18 is an explanatory diagram showing one example of the operation sequence of service discovery in Embodiment 3 of the invention shown in FIG. 17.

FIG. 18 is an explanatory diagram showing one example of the operation sequence of service discovery in Embodiment 3 of the present invention shown in FIG. 17. The sequence from the start-up of the terminal device 1700 to the service discovery of a service provider belonging to a different CDN is now explained in accordance with the operation sequence diagram of FIG. 18.

The terminal device 1700 uses a known multicast address and a port, or uses a known unicast address and requests service provider discovery information to the CDN configuration information server 1710 (ST1000). In response to this request, the CDN configuration information server 1710 sends the service provider discovery information of one or more IPTV service provider configuration information servers (ST1010).

The terminal device 1700 parses the acquired information, and acquires the address information of the IPTV service provider configuration information server 1720. The terminal 1700 uses the address information and requests service provider service discovery information to the IPTV service provider configuration information server 1720 (ST1100). In response to this request, the IPTV service provider configuration information server 1720 sends the service provider service discovery information (ST1110). The acquired service provider service discovery information includes information concerning the extension services provided by the arbitrary service provider 1780 including the standard internet. Since this information contains the brief description and address information of the respective services, a user can directly request detailed information concerning the services that are of interest to that user or concerning the arbitrary service provider 1780 on the internet.

The terminal device 1700 requests extension service offer information to the extension service server 1770 (ST1200). In response to this request, the extension service server 1770 sends the extension service offer information (ST1210). The acquired information contains the detailed description and address information of the relevant service. Finally, the terminal device 1700 uses the extension service of an arbitrary service provider including the open internet by using the address information obtained at ST1210 (ST1250). In addition, the extension service server providing the service and the server providing the service offer information do not need to be the same server. The terminal device 1700 can also use the service of an extension service server 1760 that is different from the server 1770 providing the service offer information (ST1260).

Next, management of the discovery information and extension service offer information in Embodiment 3 of the present invention is explained. XML notation is used for managing information in consideration of its suitability for parsing, search and portability.

Figure 19:
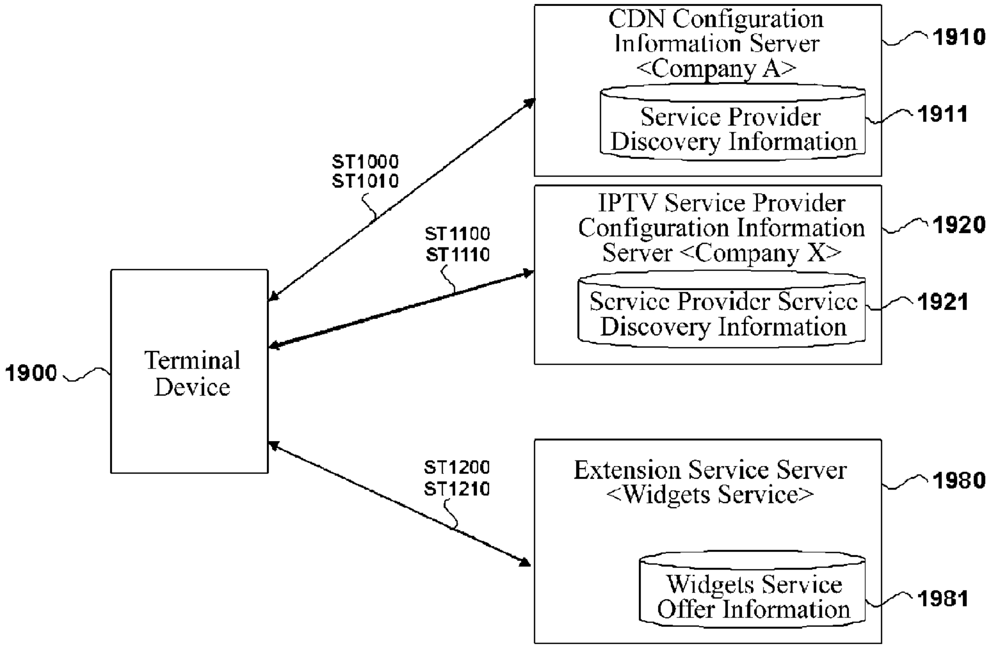
FIG. 19 is an explanatory diagram showing one example of the external extension service server including the standard internet which provides the terminal device of Embodiment 3 of the invention with the extension service via the service provider.

FIG. 19 is an explanatory diagram showing one example of the external arbitrary service provider which provides the terminal device 1900 of Embodiment 3 of the present invention with the extension service via the service provider. In FIG. 19, the terminal device 1900 acquires, in order, the information that is managed by the respective servers, and ultimately acquires the external service offer information. The CDN configuration information server 1910 includes: a unit 1911 for storing the service provider discovery information, and manages the service provider discovery information. The IPTV service provider configuration information server 1920 includes: a unit 1921 for storing the service provider service discovery information provided by the service provider, and manages the service provider service discovery information. The extension service server 1980 includes: a unit 1981 for storing the service offer information of the extension service provided by an external arbitrary service provider, manages the service offer information of the extension service, and, in this example, provides Offer information of the Widgets service to the terminal device 1900.

The service provider discovery information managed by the CDN configuration information server 1910, the service provider service discovery information managed by the IPTV service provider configuration information server 1920, and the service offer information managed by the extension service server 1980 are managed, for example, a table using the XML notation explained below.

The elements of the service provider discovery information managed by the CDN configuration information server 1910 are the same as the service provider discovery information table 400, which indicates the service provider discovery information in XML, managed by the CDN configuration information server 310 explained with reference to FIG. 5 of Embodiment 1 of the present invention.

FIG. 20 is an explanatory diagram showing one example of the service provider service discovery information table 2000, which indicates the service provider service discovery information in XML, managed by the IPTV service provider configuration information server 1920 of Embodiment 3 of the present invention. In the service provider service discovery information table 2000 in XML notation shown in FIG. 20, the column of Element/Attribute 2001 shows the XML elements and attributes, those without "@" before their name represent an XML element, and those with "@" before their name represent an attribute. The column of Value 2002 shows an example of the value that is adopted by the XML element or attribute.

@RecordVersion 2010 manages the version of the recording of the service provider service discovery information. The version number is useful in determining the validity of the information that is cached in the terminal device by being updated in the case where there is a change in the value of the element.

Items of the Service Provider manage the basic information of the service provider according to the following elements and attributes. @ServiceProviderDomainName 2020 is an item for uniquely identifying the service provider, @ServiceProviderAuthority 2021 shows the service provider to be used in a fee-based service, and @ServiceProviderVersion 2022 manages the version of the service provider information. The version number is useful in determining the validity of the information that is cached in the terminal device by being updated in the case where there is a change in the value of the element. @ServiceProviderLogoURI 2023 is used for designating the server resource storing the logo of the service provider. ServiceProviderName 2024 and ServiceProviderDescription 2025 indicate the service name to the user and a brief description of the service contents.

Items of the Service Offer Summary describe the access information to the extension services according to the following attributes. @PushAddress 2030 and @PullAddress 2031 describe the multicast address and unicast address for accessing the extension service offer information. The same information is obtained regardless of which address information is used. In the case of an extension service server based on the standard internet, only the URL information of @PullAddress 2031 is generally provided. OfferPayloadType@id 2032 is used for identifying the type of service. @segmentID 2033 is used for requesting service offer information of a specific OfferPayloadType@id. @segmentVersion 2034 is used for confirming whether service offer information of a specific OfferPayloadType@id is stored in the memory. @WebPortalURL 2035 is an address for accessing the web pages that describe the extension service offer information in the formats of HTML, XHTML, JavaScript (registered trademark), Ajax, Flash (registered trademark), ActionScript and the like. In the foregoing case, the terminal device needs to be compatible with a sophisticated display unit and user interface unit such as a web browser, but abundant information can be acquired in addition to the extension service offer information. Moreover, the service provider may also additionally indicate the Service Offer Summary access information of a plurality of servers. In one example of FIG. 20, @PushAddress 2036 to @WebPortalURL 2041 of the Service Offer Summary are access information to the second server providing the Widgets service. @PushAddress 2036 to @WebPortalURL 2041 manage information elements and attributes which are equivalent to those of @PushAddress 2030 to @WebPortalURL 2035.

FIG. 21 is an explanatory diagram showing one example of the table 2100 defining the identification value of the type of service in OfferPayloadType@id of the service provider service discovery information table 2000 of Embodiment 3 of the present invention. In the table 2100 defining the identification value of the type of service shown in FIG. 21, the column of OfferPayloadType@id Value 2101 shows an example of the identification value of the type of service. The column of SD&S record carried 2102 shows the meaning of the identification value. In the example of OfferPayloadType@id 2032, the extension provided by the service provider is Open Internet Widget Services, and the value is 0xF0 based on 2130 of FIG. 21.

Since a user private area is used, the extension services provided by the respective service providers can be freely added. Moreover, even if two service providers use OfferPayloadType@id of the same user private area in different extension services, since the pair of "OfferPayloadType@id" and "service provider domain name (ServiceProviderDomainName)" is unique, identification is possible. @segmentID (segment ID) and @segmentVersion (segment version) are described in the cases of dividing an XML document into segments and sending them to a terminal. The terminal uses the segment ID and segment version and requests information of a specific OfferPayloadType@id.

FIG. 22 is an explanatory diagram showing one example of the Widgets service offer information table 2200, in which the service offer information is indicated in XML, for managing the Widgets service provided by the extension service server 1980 of Embodiment 3 of the present invention. In the Widgets service offer information table 2200 in XML notation shown in FIG. 22, the column of Element/Attribute 2201 shows the XML elements and attributes, those without "@" before their name represent an XML element, and those with "@" before their name represent an attribute. The column of Value 2202 shows an example of the value that is adopted by the XML element or attribute.

In the Widgets service offer information table 2200 of FIG. 22, @DomainName 2203 is an item for uniquely identifying the provider providing the extension service. @Version 2204 shows the version number of the recorded information. The version number is useful in determining the validity of the information that is cached in the terminal device by being updated in the case where there is a change in the value of the element. Application@Id 2210, 2230 are an application identifier, and are used for confirming the mutual compatibility between the terminal device 1900 and the extension service server 1980. The terminal device determines whether a service can be run based on the identifier. Name 2211, 2231 and Description 2212, 2232 indicate the service name to the user and detailed descriptions of the service contents. Author 2213, 2233 are the name of the writer of the Widgets application. License 2214, 2234 are license agreements or copyright indications of the Widgets application. Language 2215, 2235 are the language supported by the Widgets application. In terms of the data type, for example, a two-letter language code as defined in ISO 639-1 can be used. Minver 2216, 2236 are the minimum version number of the Widgets engine that is required for the Widgets application to operate. Maxver 2217, 2237 are the maximum version number of the Widgets engine that is required for the Widgets application to operate. Rating 2218, 2238 are attributes showing the evaluation. Downloads 2219, 2239 are the total number of downloads of the Widgets application. Added 2220, 2240 are the date and time that the Widgets application is initially registered. Updated 2221, 2241 are the date and time that the Widgets application is last updated. Picked 2222, 2242 show the operator's "Recommended" flag. Tag 2223, 2243 are the aggregation of "tags" as the keywords that are associated with the Widgets application. Locator 2224, 2244 describe the address information of multicast or unicast for using the Widgets service.

As mentioned above, a service information provision apparatus comprising as the data service information table: the service provider service discovery information table 2000 of the IPTV service provider configuration information server 1720; and the Widgets service offer information table 2200 as the extension service of the extension service server 1770 can thereby be configured.

Note that this service information provision apparatus may also be configured to have a data service information table including the service provider discovery information table 400 of the CDN configuration information server 110.

Moreover, the server configuring the service information provision apparatus may also be realized as a system of distributing the functions to a plurality of server machines via a network rather than supporting all functions with a single server machine.

Moreover, configured is a terminal device as the service information acquisition apparatus comprising: a unit for requesting service discovery information to the service provider configuration information server 1720 specified in the specific information of the service provider; a unit for requesting service offer information to the service server specified in the specific information of the extension service server 1770 indicated in the service discovery information that is returned in response to the request by the unit for requesting the second service discovery information; and a unit for acquiring the service offer information that is returned in response to the request by the unit for requesting the service offer information.

Note that the terminal device as the service information acquisition apparatus may include: a unit for requesting service provider discovery information to the CDN configuration information server 110, and be configured to request service discovery information to the service provider configuration information server 120 specified in the specific information of the service provider indicated in the service provider discovery information that is returned in response to the request by the unit for requesting the service provider discovery information.

The operation sequence shown in FIG. 18 is performed between the service information acquisition apparatus and the service information provision apparatus by using the service provider discovery information table 400, the service provider service discovery information table 2000, and the Widgets service offer information table 2200 managed by the respective servers of the service information provision apparatus.

As described above, according to Embodiment 3 of the present invention, the IPTV service provider configuration information server provides, to the terminal device, service provider service discovery information for discovering the external extension service including the standard internet. Consequently, the terminal device can access the extension service server of the external IPTV service provider.

Embodiment 4

In the aforementioned Embodiment 1 of the present invention, explained is one example of providing, to a terminal device, service provider service discovery information for discovering an extension service within the scope of the same service provider. In Embodiment 2 of the present invention, explained is one example of enabling the service discovery of an extension service belonging to a separate service provider. Moreover, in Embodiment 3 of the present invention, explained is one example enabling the service discovery of an extension service on the standard internet without being limited to a CDN by using a service provider configuration information server. In this case, there is no need to use the service provider configuration information server of the service provider to which the extension service belongs.

Embodiment 4 of the present invention explains one example of enabling the use of the service provider discovery server on the standard internet, without using the content delivery network (CDN) or CDN configuration information server provided by a network provider, so as to discover the service provider. In this case, even after discovering the service provider, the IPTV service provider configuration information server, the basic video service server, and the extension service server can be accessed via the standard internet.

Figure 23:
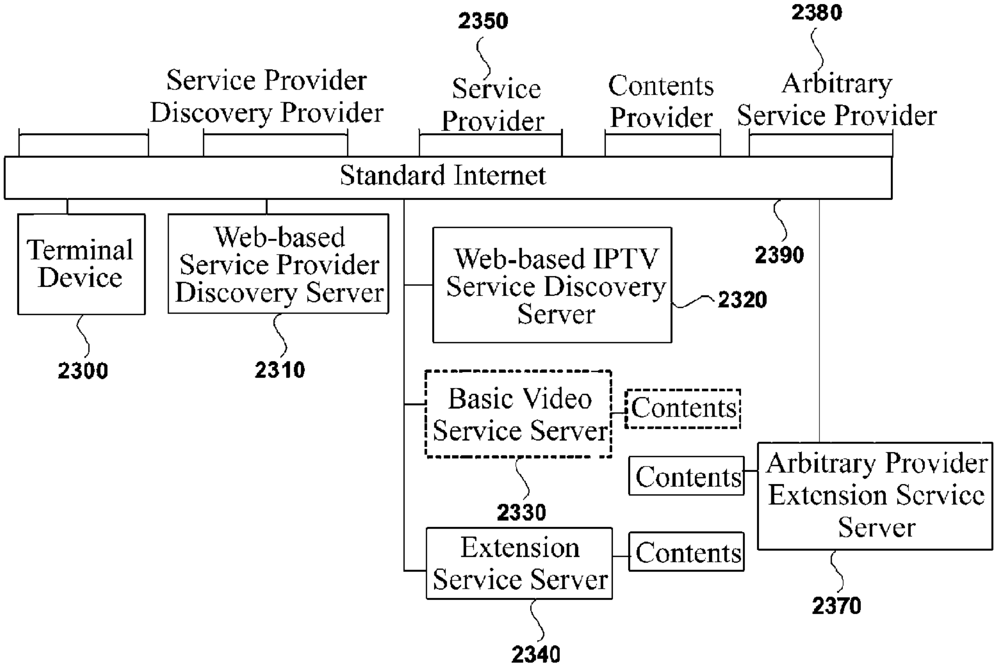
FIG. 23 is an explanatory diagram showing one example of the configuration of Embodiment 4 of the invention.

FIG. 23 is an explanatory diagram showing one example of the configuration of Embodiment 4 of the invention. In FIG. 23, a terminal device 2300 is a terminal using an IPTV service. A Web-based service provider discovery server 2310 manages information concerning service providers including address information of the Web-based IPTV service discovery server 2320, and provides this information to the terminal device 2300 in a web page format. The Web-based IPTV service discovery server 2320 manages information for discovering and using a basic video service and an extension service, manages information for discovering an extension service server 2370 of an arbitrary service provider 2380, and provides information to the terminal device 2300 in a web page format. A basic video service server 2330 provides an IPTV basic video service, and provides a server function of the IP broadcast server and/or the video on-demand server. An extension service server 2340 provides data and information service without limitation to video contents. Service discovery information of the basic video service server 2330 and the extension service server 2340 is managed by the Web-based IPTV service discovery server 2320. Service provider 2350 shows the operational domain of the service provider providing the IPTV service. The service provider 2350 includes, in addition to the Web-based IPTV service discovery server 2320, a server of the basic video service server 2330 and/or the extension service server 2340. The extension service server 2370 is a server corresponding to the extension service server 2340. Moreover, the extension service server 2370 belongs to an arbitrary service provider 2380 of a CDN or standard internet that is different from the service provider 2350. The standard internet is one example of the arbitrary service provider. The arbitrary service provider 2380 includes the extension service server 2370. The standard internet 2390 provides an environment that enables the mutual communication of the terminal device 2300 and the respective servers (Web-based service provider discovery server 2310, Web-based IPTV service discovery server 2320, basic video service server 2330, extension service servers 2340, 2370).

Next, an operation thereof is described.

Figure 24:
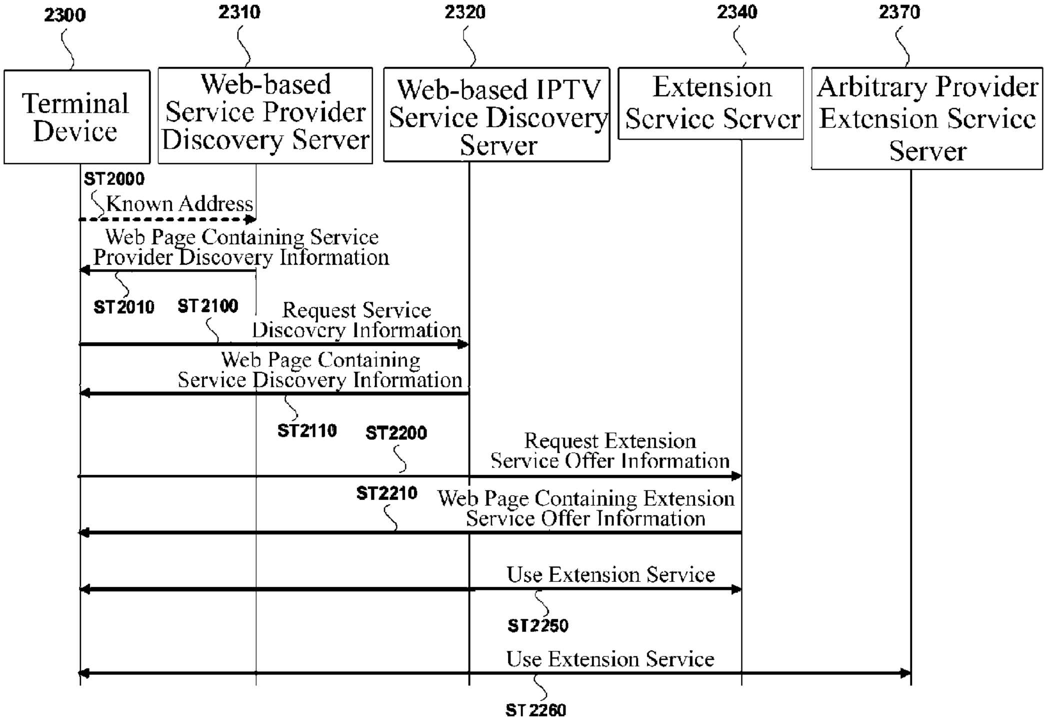
FIG. 24 is an explanatory diagram showing one example of the operation sequence of the Web-based service discovery in Embodiment 4 of the invention shown in FIG. 23.

FIG. 24 is an explanatory diagram showing one example of the operation sequence of the Web-based service discovery in Embodiment 4 of the invention shown in FIG. 23. The sequence from the start-up of the terminal device 2300 to the service discovery of an arbitrary service provider on the standard internet is now explained in accordance with the operation sequence diagram of FIG. 24.

The terminal device 2300 uses a known URI or URL address and requests a web page provided by the Web-based service provider discovery server 2310 (ST2000). In response to this request, the Web-based service provider discovery server 2310 returns, to the terminal device 2300, the hyper link information to the Web-based IPTV service discovery server 2320 of one or more service providers 2350, and the web page document containing icons and related information of the service providers 2350 (ST2010).

The terminal device 2300 parses the acquired web page document and displays a web page. Icons and related information of available service providers 2350 are displayed on the web page. An end user can select the service provider 2350 by referring to the icons and related information. Since the icon is linked with the hyper link information to the service provider 2350, the web page provided by the Web-based IPTV service discovery server 2320 is requested by selecting an icon by using the UI or the like of the terminal (ST2100). The Web-based IPTV service discovery server 2320 returns, to the terminal device 2300, a web page document containing the hyper link information to the extension service server 2340 belonging to the same service provider 2350 and/or the extension service server 2370 of the arbitrary service provider 2380, as well as the icons and related information of the service (ST2110). The acquired service information web page document contains information concerning the extension service provided by the arbitrary service provider 2380 including the standard internet. Since this information contains the brief description and address information of the respective services, a user can directly request detailed information concerning the services that are of interest to the user or concerning the arbitrary service provider 2380 on the internet.

The terminal device 2300 requests a service detailed web page document containing extension service offer information to the extension service server 2340 (ST2200). In response to this request, the extension service server 2340 sends the service detailed web page document containing the extension service offer information (ST2210). The acquired web page document contains the detailed description and hyper link address information of the relevant service. Finally, the terminal device 2300 uses the extension service of an arbitrary service provider 2380 including the open Internet by using the hyper link address information obtained at ST2210 (ST2250). In addition, the extension service server providing the service and the server providing the service offer information do not need to be the same server. The terminal device 2300 can also use the service of an extension service server 2370 that is different from the extension service server 2340 providing the service offer information (ST2260).

Next, management of the discovery information and extension service offer information in Embodiment 4 of the invention is explained. XML notation is used for managing information in consideration of its suitability for parsing, search and portability.

Figure 25:
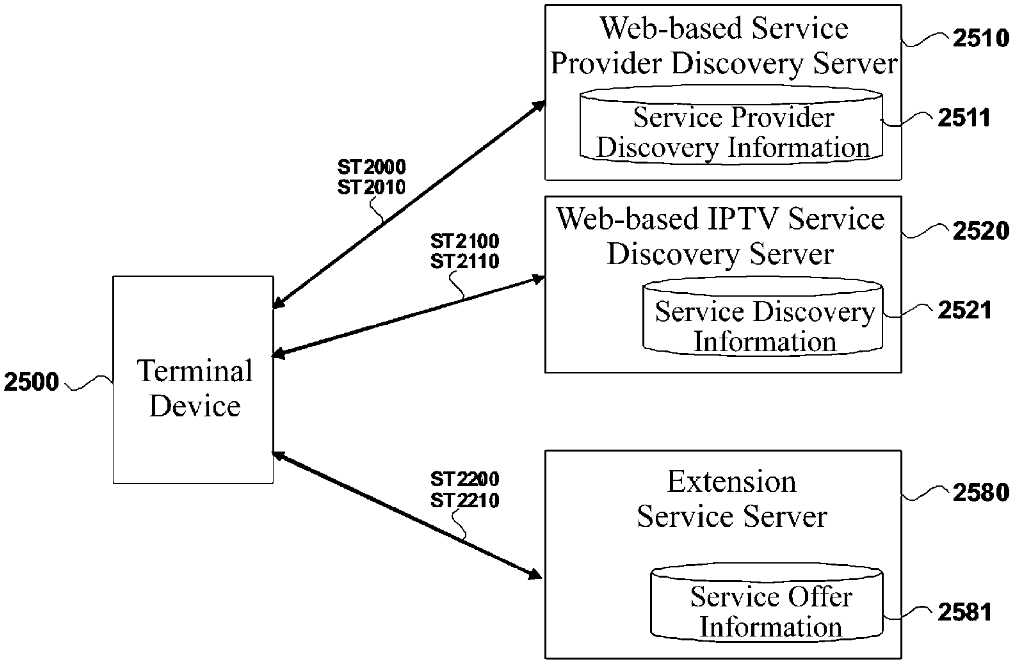
FIG. 25 is an explanatory diagram showing one example of the external arbitrary service provider which provides the terminal device 2500 of Embodiment 4 of the invention with the extension service via the service provider.

FIG. 25 is an explanatory diagram showing one example of the external arbitrary service provider which provides the terminal device 2500 of Embodiment 4 of the invention with the extension service via the service provider. In FIG. 25, the terminal device 2500 accesses, in order, the web pages provided by the respective servers, and ultimately acquires the service offer information. The Web-based service provider discovery server 2510 includes: a unit 2511 for storing the service provider discovery information, and manages the service provider discovery information. The Web-based IPTV service discovery server 2520 includes: a unit 2521 for storing the service discovery information provided by the service provider, and manages the service discovery information. The extension service server 2580 includes: a unit 2581 for storing the service offer information of the extension service provided by an arbitrary service provider, and manages the service offer information of the extension service.

The service provider discovery information managed by the Web-based service provider discovery server 2510, the service discovery information managed by the Web-based IPTV service discovery server 2520, and the service offer information managed by the extension service server 2580 are managed, for example, as a table using the XML notation explained below.

The elements of the service provider discovery information managed by the Web-based service provider discovery server 2510 are the same as the service provider discovery information table 400 (refer to FIG. 5), which indicates the service provider discovery information in XML, managed by the CDN configuration information server 310 explained in Embodiment 1 of the invention.

The elements of the service discovery information managed by the Web-based IPTV service discovery server 2520 are the same as the service discovery information table 500 (refer to FIG. 6), which indicates the service provider service discovery information in XML, managed by the IPTV service provider configuration information server 320 explained in Embodiment 1 of the invention.

The elements of the service offer information managed by the extension service server 2580 are the same as the service offer information tables 600, 700, 1500, 2200 (refer to FIG. 8, FIG. 9, FIG. 16, FIG. 22), which indicate the service offer information in XML, managed by the extension service servers 330, 340 explained in Embodiments 1, 2 and 3 of the invention.

As described above, with the service information provision apparatus and the service information acquisition apparatus of the invention, the IPTV service provider configuration information server configuring the service information provision apparatus can provide, to the terminal device as the service information acquisition apparatus, service provider service discovery information for discovering an extension service other than the transmission of video contents as the basic IPTV service, and the terminal device can access the extension service server based on the address information of the extension service server described in the service provider service discovery information.

Moreover, with the service information provision apparatus and the service information acquisition apparatus of the invention, the IPTV service provider configuration information server configuring the service information provision apparatus provides service provider discovery information of the external IPTV service provider, and the external IPTV service provider configuration information server provides service provider service discovery information for discovering the extension service, to the terminal device as the service information acquisition apparatus, and the terminal device can thereby access the extension service server of the external IPTV service provider.

With the service information provision apparatus and the service information acquisition apparatus of the invention, the terminal device as the service information acquisition apparatus, which could only consume video contents transmission services in the past, is able to access and provide to the user new data services such as news distribution.

Note that, although the tables managed by the respective servers configuring the service information provision apparatus of the invention are explained in XML notation, they may also be indicated in languages and formats that are different from XML. Moreover, the tables may also contain items, elements and attributes of other uses that are not used in the foregoing descriptions.

INDUSTRIAL APPLICABILITY

The service information provision apparatus and the service information acquisition apparatus according to the invention are suitable for use in data/information provision services corresponding to various types of contents in addition to video contents services.

The invention claimed is:

1. A service information acquisition apparatus, comprising:

a processor-based device programmed to:

send a request for first service discovery information to a first service provider configuration information server;

send a first request for service offer information to a first service server specified by specific information of the first service server, the first service server belonging to a first service provider, the specific information of the first service server being indicated in the first service discovery information acquired in response to the request for the first service discovery information; and acquire the service offer information of the first service server in response to the first request for the service offer information, wherein the processor-based device is further programmed to:

send a request for second service discovery information to a second service provider configuration information server, send a second request for the service offer information to a second service server specified by specific information of the second service server, the second service server belonging to a second service provider, the specific information of the second service server being indicated in the second service discovery information acquired in response to the request for the second service discovery information, and acquire the service offer information of the second service server in response to the second request for the service offer information.

2. The service information acquisition apparatus according to claim 1, wherein the processor-based device is further programmed to send a request for service provider discovery information to a network configuration information server, and receive the service provider discovery information in response to the request for the service provider discovery information, the service provider discovery information indicating the first service provider configuration information server.

* * * * *